(12) United States Patent
Kang

(10) Patent No.: US 11,018,391 B2
(45) Date of Patent: May 25, 2021

(54) BATTERY CELL, BATTERY MODULE, AND BATTERY PACK AND VEHICLE INCLUDING THE SAME

(71) Applicant: LG CHEM, LTD., Seoul (KR)

(72) Inventor: Ju-Hyun Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 195 days.

(21) Appl. No.: 16/345,150

(22) PCT Filed: Apr. 11, 2018

(86) PCT No.: PCT/KR2018/004256
§ 371 (c)(1),
(2) Date: Apr. 25, 2019

(87) PCT Pub. No.: WO2018/208020
PCT Pub. Date: Nov. 15, 2018

(65) Prior Publication Data
US 2019/0319228 A1 Oct. 17, 2019

(30) Foreign Application Priority Data
May 8, 2017 (KR) .................. 10-2017-0057505

(51) Int. Cl.
*H01M 50/172* (2021.01)
*H01M 10/04* (2006.01)
*H01M 10/42* (2006.01)
*H01M 50/10* (2021.01)
*H01M 50/20* (2021.01)
*H01M 50/502* (2021.01)
(Continued)

(52) U.S. Cl.
CPC ..... *H01M 50/172* (2021.01); *H01M 10/0445* (2013.01); *H01M 10/425* (2013.01); *H01M 50/10* (2021.01); *H01M 50/20* (2021.01); *H01M 50/502* (2021.01); *H01M 50/531* (2021.01); *H01M 50/543* (2021.01); *H01M 2010/4271* (2013.01); *H01M 2220/20* (2013.01)

(58) Field of Classification Search
CPC .......... H01M 2/06; H01M 2/206; H01M 2/26; H01M 10/0445; H01M 10/425; H01M 50/172
USPC ....................................... 429/179
See application file for complete search history.

(56) References Cited

U.S. PATENT DOCUMENTS

| 2004/0067415 | A1 | 4/2004 | Lai | |
| 2009/0098459 | A1* | 4/2009 | Takezawa | H01G 11/28 |
| | | | | 429/209 |

(Continued)

FOREIGN PATENT DOCUMENTS

| JP | 3093989 U | 5/2003 |
| JP | 2008-97942 A | 4/2008 |

(Continued)

OTHER PUBLICATIONS

International Search Report issued in PCT/KR2018/004256 (PCT/ISA/210), dated Aug. 3, 2018.

*Primary Examiner* — James M Erwin
(74) *Attorney, Agent, or Firm* — Birch, Stewart, Kolasch & Birch, LLP

(57) ABSTRACT

A battery cell, which includes an electrode assembly, a battery case configured to accommodate the electrode assembly, and two pairs of electrode leads provided at outer surfaces of the battery case and connected to the electrode assembly, is provided.

15 Claims, 13 Drawing Sheets

(51) Int. Cl.
*H01M 50/531* (2021.01)
*H01M 50/543* (2021.01)

(56) References Cited

U.S. PATENT DOCUMENTS

| | | |
|---|---|---|
| 2010/0248010 A1 | 9/2010 | Butt et al. |
| 2011/0117402 A1 | 5/2011 | Kim et al. |
| 2012/0171552 A1 | 7/2012 | Lachenmeier et al. |
| 2016/0204410 A1 | 7/2016 | Heo |
| 2016/0322838 A1 | 11/2016 | Jung |
| 2016/0372805 A1 | 12/2016 | Kim et al. |

FOREIGN PATENT DOCUMENTS

| | | |
|---|---|---|
| KR | 10-2011-0053163 A | 5/2011 |
| KR | 10-2011-0114649 A | 10/2011 |
| KR | 10-2015-0100365 A | 9/2015 |
| KR | 10-2015-0104312 A | 9/2015 |
| KR | 10-2016-0087220 A | 7/2016 |
| KR | 10-2016-0128792 A | 11/2016 |
| KR | 10-2017-0010667 A | 2/2017 |
| KR | 10-2017-0035218 A | 3/2017 |
| KR | 10-1723052 B1 | 4/2017 |
| WO | WO 2005/020348 A2 | 3/2005 |
| WO | WO 2011/161098 A1 | 12/2011 |

\* cited by examiner

BATTERY CELL, BATTERY MODULE, AND BATTERY PACK AND VEHICLE INCLUDING THE SAME

TECHNICAL FIELD

The present disclosure relates to a battery cell, a battery module, and a battery pack and a vehicle including the same.

The present application claims priority to Korean Patent Application No. 10-2017-0057505 filed on May 8, 2017 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at the present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.6V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components.

Conventionally, when a plurality of battery cells are coupled or a plurality of battery modules are coupled to each other, since polarities are provided just in one direction or two directions at the individual battery cells or battery modules, the cells or modules have the deteriorated degree of freedom of coupling due to the structure of electrode leads or electrode bus bars thereof.

Accordingly, when the number of battery cells or battery modules to be coupled increases, space loss increases due to empty spaces among the cells or the modules because the coupling form of the cells or modules is limited in a mechanical aspect. Here, the space loss such as an empty space acts as a negative factor in terms of the total energy density, which inevitably becomes a factor of unnecessarily increasing the size.

Thus, it is required to find a way to increase the degree of freedom of coupling, improve the energy density and realize a slimmer structure when a plurality of battery cells or battery modules are coupled to each other.

DISCLOSURE

Technical Problem

Therefore, the present disclosure is directed to providing a battery cell, a battery module, and a battery pack and a vehicle including the same, which may increase the degree of freedom of coupling when a plurality of battery cells or battery modules are coupled to each other.

Moreover, the present disclosure is directed to providing a battery cell, a battery module, and a battery pack and a vehicle including the same, which may improve the energy density.

In addition, the present disclosure is directed to providing a battery cell, a battery module, and a battery pack and a vehicle including the same, which may have a slimmer structure according to the recent trend for a slimmer design.

Technical Solution

In one aspect of the present disclosure, there is provided a battery cell, comprising: an electrode assembly; a battery case configured to accommodate the electrode assembly; and two pairs of electrode leads provided at outer surfaces of the battery case and connected to the electrode assembly.

The battery case may have a hexahedral shape having six outer surfaces, and the two pairs of electrode leads may be provided to four outer surfaces among the six outer surfaces of the battery case.

The two pairs of electrode leads may include: a pair of first electrode leads provided at a first surface of the four outer surfaces of the battery case and a second outer surface of the four outer surfaces of the battery case and disposed opposite to the first outer surface; and a pair of second electrode leads provided at a third outer surface of the four outer surfaces of the battery case and a fourth outer surface of the four outer surfaces of the battery case, which are adjacent to the first outer surface and the second outer surface and disposed opposite to each other.

The pair of first electrode leads may have different polarities.

The pair of second electrode leads may have different polarities.

The battery cell may be provided in plural, and the plurality of battery cells may be block-coupled to each other.

In another aspect of the present disclosure, there is also provided a battery module, comprising: at least one battery cell; a module case configured to accommodate the at least one battery cell; and two pairs of electrode bus bars provided at outer surfaces of the module case and electrically connected to the battery cells.

The module case may have a hexahedral shape having six outer surfaces, and the two pairs of electrode bus bars may be provided at four outer surfaces among the six outer surfaces of the module case.

The two pairs of electrode bus bars may include: a pair of first electrode bus bars provided at a first surface of the four outer surfaces of the module case and a second outer surface of the four outer surfaces of the module case and disposed opposite to the first surface; and a pair of second electrode bus bars disposed at a third outer surface of the four outer surfaces of the module case and a fourth outer surface of the four outer surfaces of the module case, which are adjacent to the first outer surface and the second outer surface and disposed opposite to each other.

The pair of first electrode bus bars may have different polarities.

The pair of second electrode bus bars may have different polarities.

The battery module may further include a battery management system (BMS) provided in the module case to manage the at least one battery cell.

In another aspect of the present disclosure, there is also provided a battery pack, comprising: at least one battery module according to the above embodiments; and a pack case configured to package the at least one battery module.

The battery module may be provided in plural, and the plurality of battery modules may be block-coupled to each other.

In another aspect of the present disclosure, there is also provided a vehicle, comprising at least one battery pack according to the above embodiments.

Advantageous Effects

According to various embodiments, it is possible to provide a battery cell, a battery module, and a battery pack and a vehicle including the same, which may increase the degree of freedom of coupling when a plurality of battery cells or battery modules are coupled to each other.

Moreover, according to various embodiments, it is possible to provide a battery cell, a battery module, and a battery pack and a vehicle including the same, which may improve the energy density.

In addition, according to various embodiments, it is possible to provide a battery cell, a battery module, and a battery pack and a vehicle including the same, which may have a slimmer structure according to the recent trend for a slimmer design.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
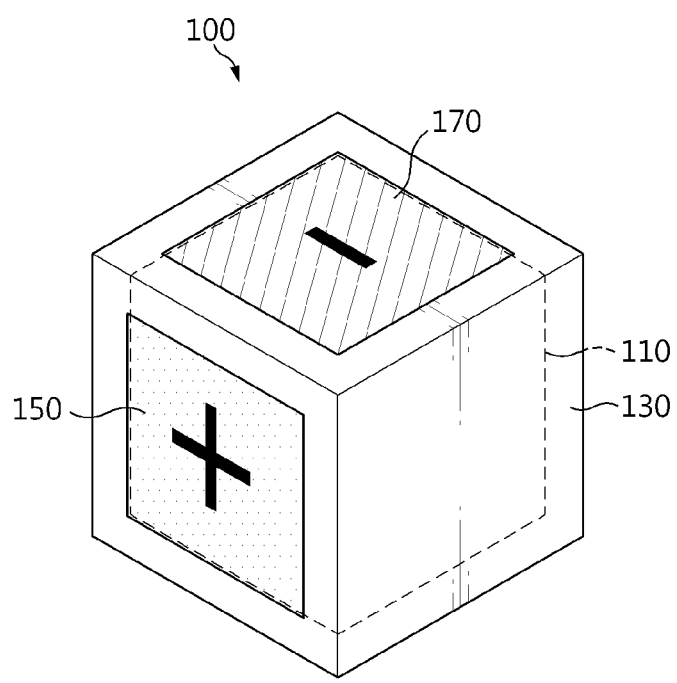
FIG. 1 is a diagram for illustrating a battery cell according to an embodiment of the present disclosure.
Figure 2:
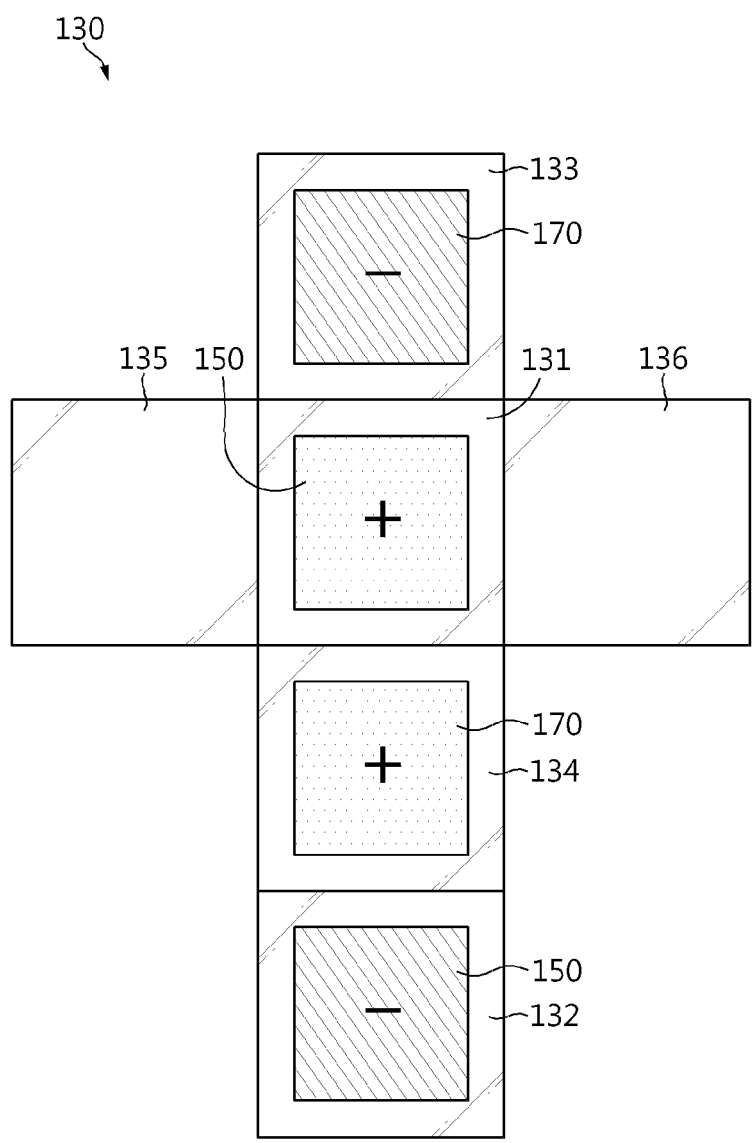
FIG. 2 is a developed view showing a battery case of the battery cell depicted in FIG. 1.

FIG. 1 is a diagram for illustrating a battery cell according to an embodiment of the present disclosure, and FIG. 2 is a developed view showing a battery case of the battery cell depicted in FIG. 1.

Referring to FIGS. 1 and 2, the battery cell 100 may be a secondary battery and may include an electrode assembly 110, a battery case 130 and two pairs of electrode leads 150, 170.

The electrode assembly 110 may include a positive electrode plate, a negative electrode plate and a separator. The electrode assembly 110 is well known in the art and thus will not be described in detail.

The battery case 130 is for accommodating the electrode assembly 110 and may have an accommodating space for accommodating the electrode assembly 110.

The battery case 130 may have an appearance with a hexahedral shape. The appearance with the hexahedral shape may increase the degree of freedom of coupling when a plurality of battery cells 100 are coupled to each other as a group. For example, as shown in FIGS. 3 to 9, when the plurality of battery cells 100 are provided as a group, the battery cells 100 are connected like simple LEGO® block coupling. Hereinafter, this will be described in detail with reference to the related drawings.

The outer surface of the battery case 130 may be composed of first to sixth surfaces 131 to 136. For example, based on FIG. 1, the first surface 131 may be a front surface, the second surface 132 may be a rear surface, the third surface 133 may be a top surface, the fourth surface 134 may be a bottom surface, the fifth surface 135 may be a left surface, and the sixth surface 136 may be a right surface.

The two pairs of electrode leads 150, 170 are provided at the outer surfaces of the battery case 130 and may be electrically connected to the electrode assembly 110. In this embodiment, the electrode leads 150, 170 are provided in two pairs, instead of one pair, as described above, and thus it is possible to increase the degree of freedom of coupling when the plurality of battery cells 100 are coupled to each other.

Hereinafter, the two pairs of electrode leads 150, 170 will be described in more detail.

The two pairs of electrode leads 150, 170 may be provided to four surfaces 131, 132, 133, 134, among the outer surfaces of the battery case 130, and may be composed of a pair of first electrode leads 150 and a pair of second electrode leads 170.

The pair of first electrode leads 150 may be provided to one surface of the battery case 130, for example the first surface 131 in this embodiment, and the other surface disposed opposite to the one surface, for example the second surface 132 in this embodiment. The pair of first electrode leads 150 may have different polarities from each other and may have a film shape with a predetermined size.

The pair of second electrode leads 170 may be provided to surfaces of the battery case 130, which are adjacent to the one surface and the other surface, namely the first surface 131 and the second surface 132, and disposed opposite to each other, namely the third surface 133 and the fourth surface 134. The pair of second electrode leads 170 may have different polarities from each other and may have a film shape with a predetermined size, similar to the pair of first electrode leads 150.

Meanwhile, the surfaces of the battery case 130 where the second electrode leads 170 and the first electrode leads 150 are not provided, namely the fifth surface 135 and the sixth surface 136, may be nonpolar surfaces with no polarity. As a result, among six outer surfaces 131 to 136 of the battery case 130, two surfaces 135, 136 may be nonpolar surfaces. This is because, if all outer surfaces of the battery case 130 are provided with electrode leads with polarity, the surfaces with polarities may interfere each other when the plurality of battery cells 100 are coupled to each other. In order to prevent this interference, two outer surfaces 135, 136 among the outer surfaces of the battery case 130 may be nonpolar surfaces.

Hereinafter, the coupling form of the battery cells 100 when the plurality of battery cells 100 of this embodiment are provided as a group will be described in detail.

Figure 3:
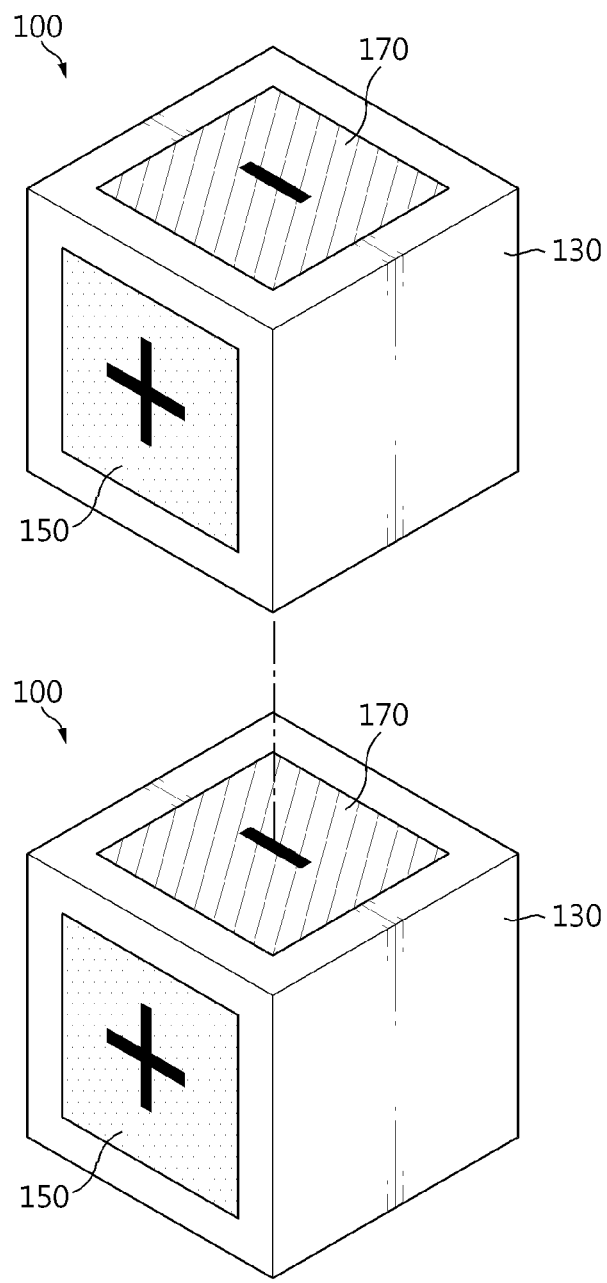
FIGS. 3 and 4 are diagrams for illustrating a block coupling of the battery cells depicted in FIG. 1.
Figure 4:
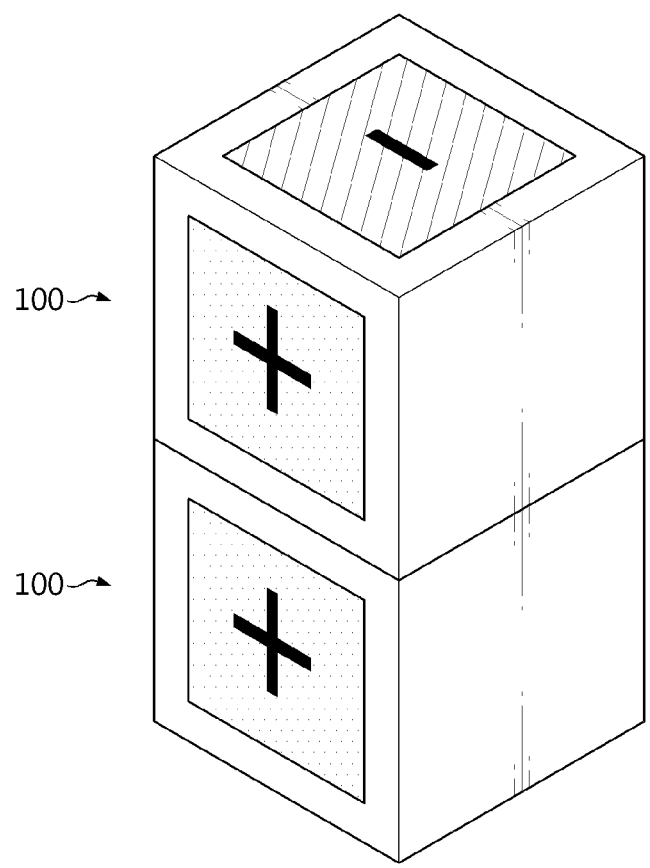

FIGS. 3 and 4 are diagrams for illustrating a block coupling of the battery cells depicted in FIG. 1.

Referring to FIGS. 3 and 4, when the plurality of battery cells 100 are coupled to each other, the battery cells 100 may be coupled in a simple way by means of simple block coupling. At this time, electric connection between them may be simply made during the block coupling by means of the two pairs of electrode leads 150, 170 with a film shape.

Hereinafter, the serial connection and parallel connection when the plurality of battery cells 100 are coupled to each other will be described.

Figure 5:
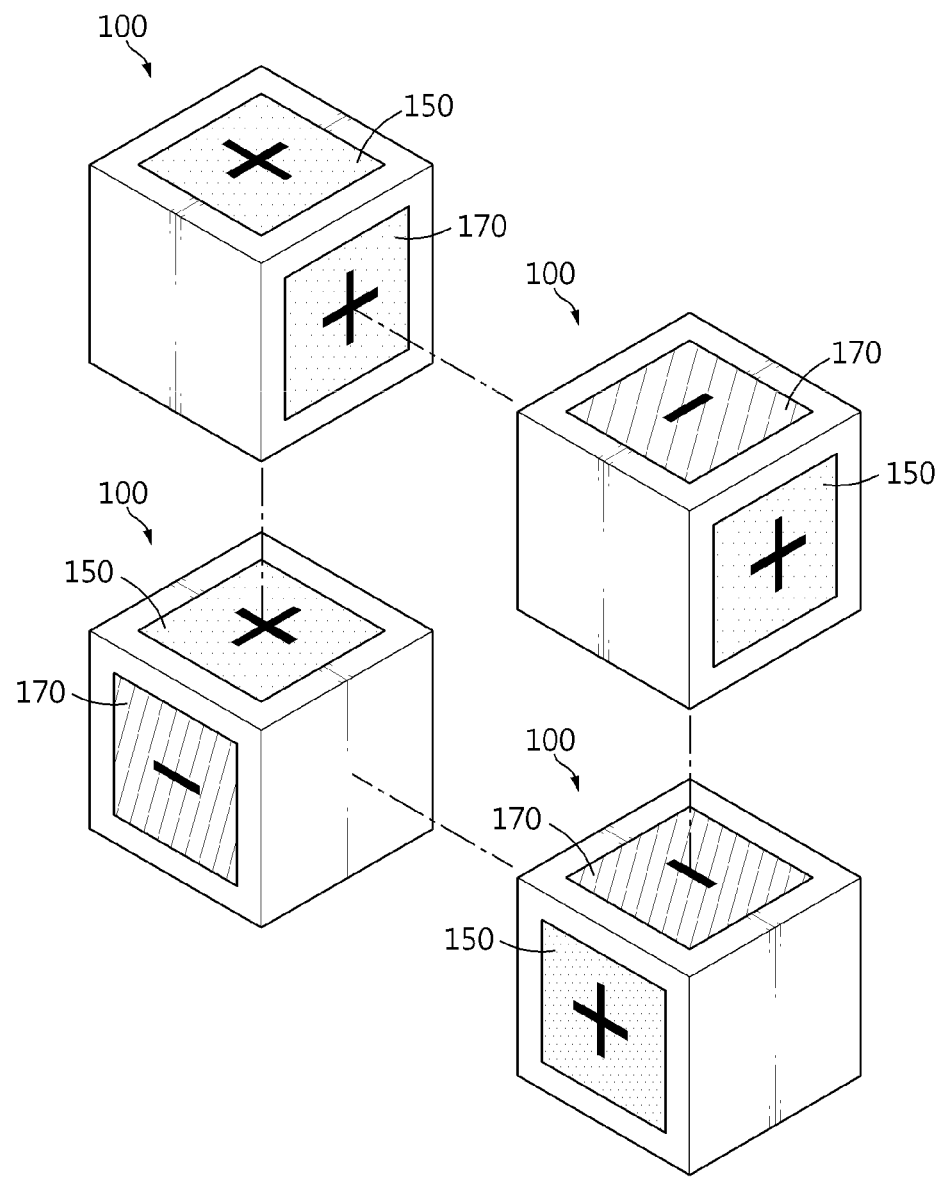
FIGS. 5 to 7 are diagrams for illustrating serial connection of the battery cells depicted in FIG. 1.
Figure 6:
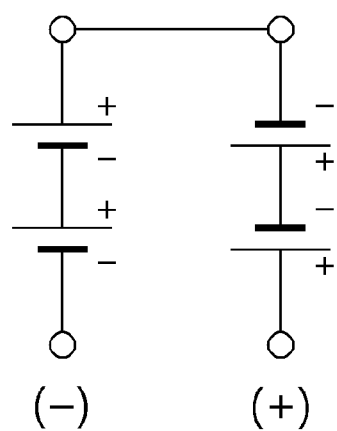
Figure 7:
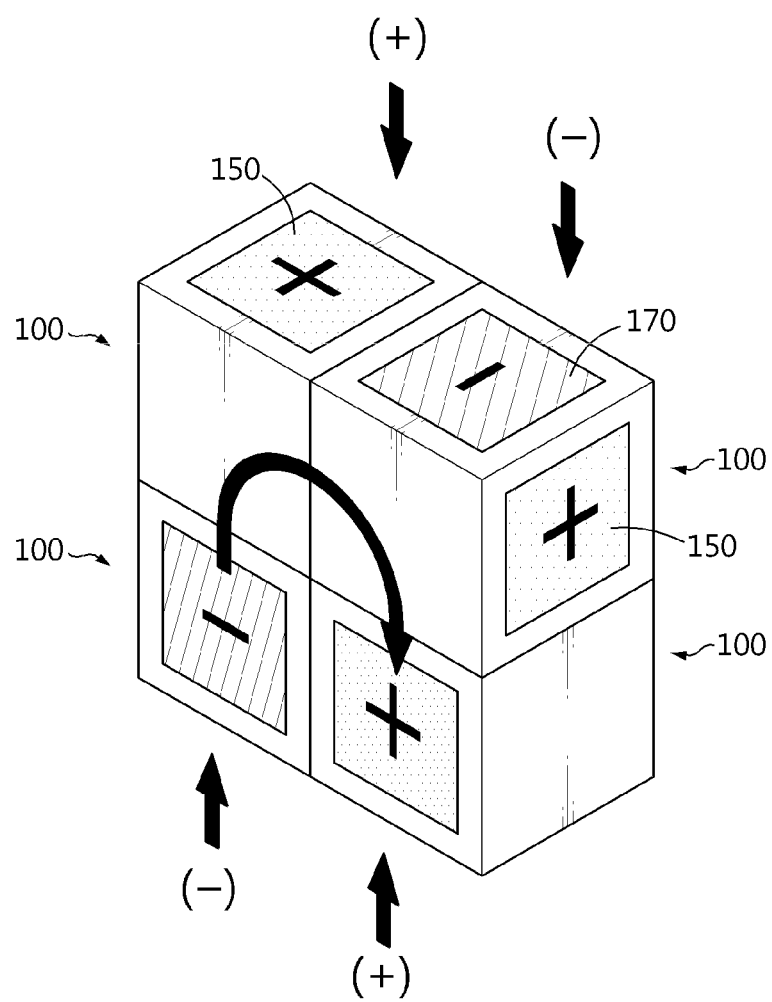

FIGS. 5 to 7 are diagrams for illustrating serial connection of the battery cells depicted in FIG. 1.

Referring to FIGS. 5 to 7, when four battery cells 100 are connected in series, a worker or the like may dispose the battery cells 100 so that the electrode leads 150, 170 of facing battery cells have different polarities, and then simply block-couple the battery cells.

Figure 8:
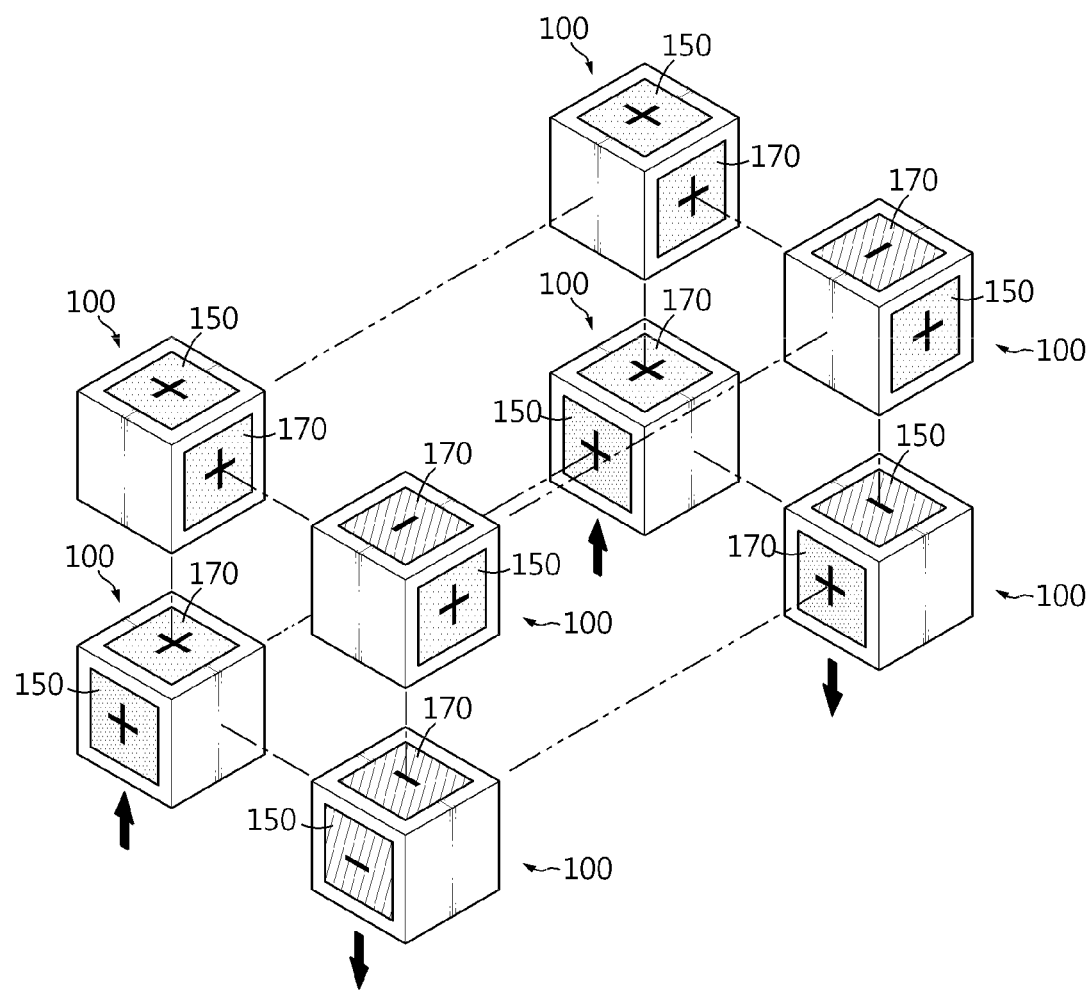
FIGS. 8 and 9 are diagrams for illustrating parallel connection of the battery cells depicted in FIG. 1.
Figure 9:
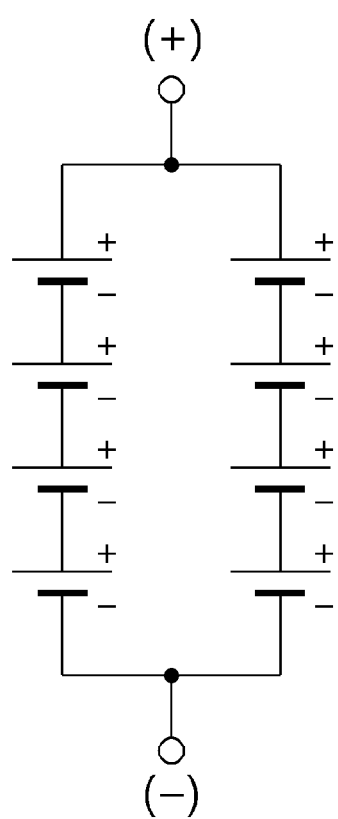

FIGS. 8 and 9 are diagrams for illustrating parallel connection of the battery cells depicted in FIG. 1.

Referring to FIGS. 8 and 9, when eight battery cells 100 are connected in parallel, a worker or the like may dispose four battery cells 100 at a front side and a rear side, respectively, then dispose the electrode leads 150, 170 of the battery cells 100 as shown in FIG. 8, and then block-couple the battery cells 100.

As described above, the battery cell 100 of this embodiment may enhance the degree of freedom of coupling when the plurality of battery cells 100 are coupled, by means of the battery case 130 with a hexahedral shape and the two pairs of electrode leads 150, 170 provided at the outer surfaces of the battery case 130, and may also secure easy workability by means of block coupling.

In addition, the battery cell 100 of this embodiment may minimize a space loss such as an empty space, which may occur due to coupling, by means of the battery case 130 with a hexahedral shape and the two pairs of electrode leads 150, 170 with a film shape, when the plurality of battery cells 100 are coupled.

Accordingly, when the plurality of battery cells 100 are coupled, the battery cell 100 of this embodiment may improve the energy density and also realize a slimmer structure according to the recent trend for a slimmer design.

Figure 10:
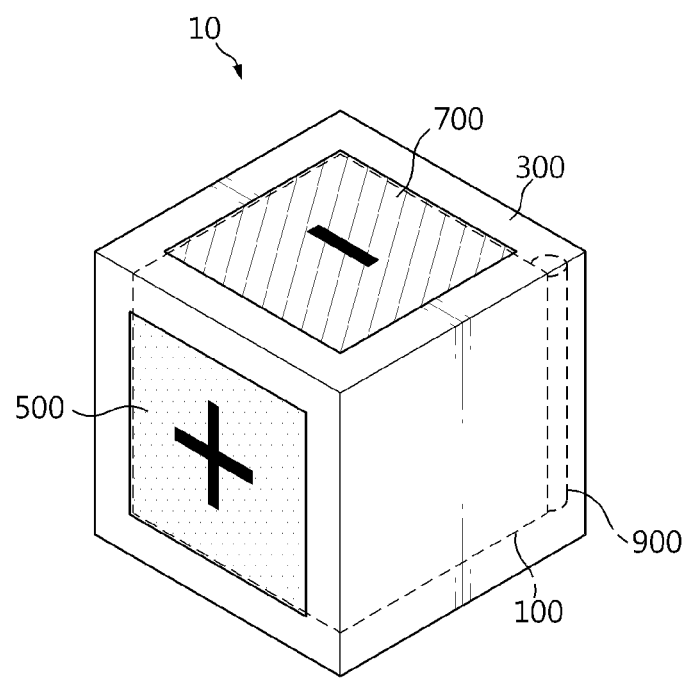
FIG. 10 is a diagram for illustrating a battery module according to an embodiment of the present disclosure.
Figure 11:
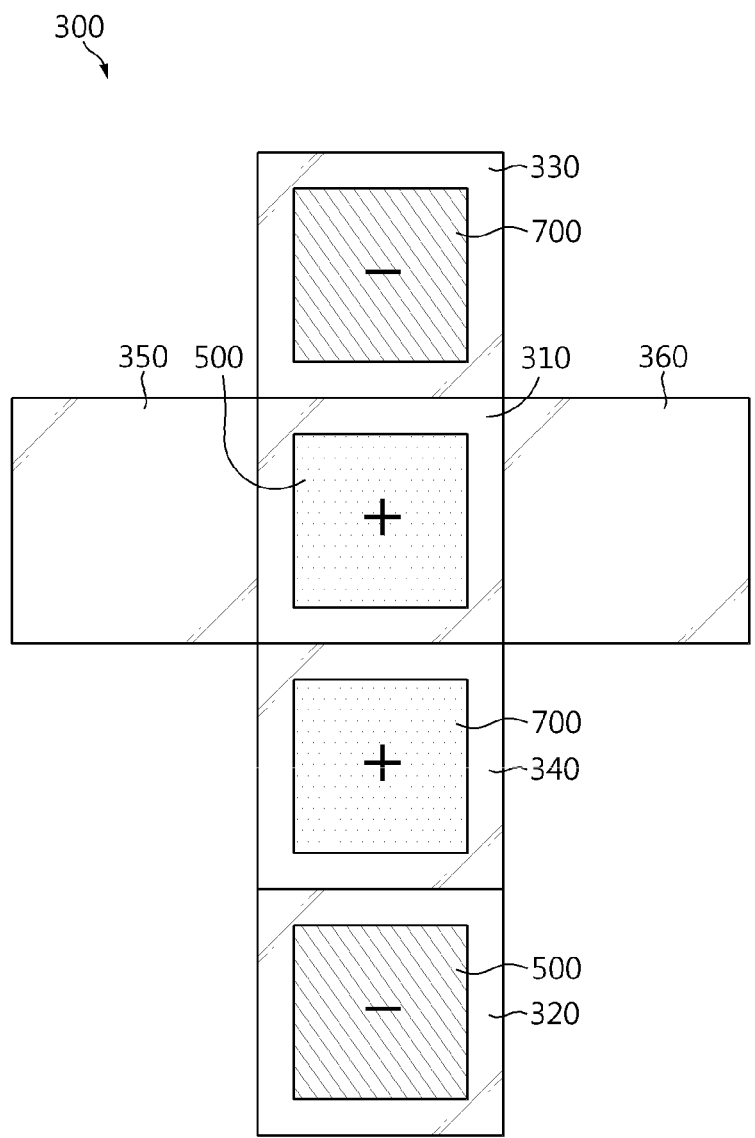
FIG. 11 is a developed view showing a module case of the battery module depicted in FIG. 10.

FIG. 10 is a diagram for illustrating a battery module according to an embodiment of the present disclosure, and FIG. 11 is a developed view showing a module case of the battery module depicted in FIG. 10.

Referring to FIGS. 10 and 11, the battery module 10 may include a battery cell 100, a module case 300, two pairs of electrode bus bars 500, 700 and a battery management system (BMS) unit 900.

The battery cell 100 may be provided as the battery cell of the former embodiment or the plurality of battery cells of the former embodiment. In addition, the battery cell 100 may be provided as a single pouch-type, rectangular or cylindrical secondary battery or a plurality of pouch-type, rectangular or cylindrical secondary batteries.

The module case 300 is for accommodating the singe battery cell 100 or the plurality of battery cells 100 and may have an accommodation space therefor.

The module case 300 may have an appearance with a hexahedral shape. The appearance with a hexahedral shape may enhance the degree of freedom of coupling when a plurality of battery modules 10 are coupled to each other as a group. In other words, when the plurality of battery modules 10 are coupled to each other, the module case 300 may increase the degree of freedom of coupling by the same mechanism as the battery case 130 of the former embodiment.

Accordingly, the outer surface of the module case 300 may also be composed of first to sixth surfaces 310 to 360. For example, the first surface 310 may be a front surface, the second surface 320 may be a rear surface, the third surface 330 may be a top surface, the fourth surface 340 may be a bottom surface, the fifth surface 350 may be a left surface, and the sixth surface 360 may be a right surface.

The two pairs of electrode bus bars 500, 700 are electrically connected to the single battery cell 100 or the plurality of battery cells 100 and may be provided at the outer surface of the module case 300. The two pairs of electrode bus bars 500, 700 may increase the degree of freedom of connection by a mechanism similar to the two pairs of electrode leads 150, 170 of the former embodiment, when the plurality of battery modules 10 are coupled to each other.

The two pairs of electrode bus bars 500, 700 may be provided to four surfaces 310, 320, 330, 340, among the outer surfaces of the module case 300 and may be composed of a pair of first electrode bus bars 500 and a pair of second electrode bus bars 700.

The pair of first electrode bus bars 500 may be provided to one surface of the module case 300, namely the first surface 310 in this embodiment, and the other surface disposed opposite to the one surface, namely the second surface 320 in this embodiment. The pair of first electrode bus bars 500 may have different polarities from each other and may have a film shape with a predetermined size.

The pair of second electrode bus bars 700 may be provided to surfaces of the module case 300, which are adjacent to the one surface and the other surface, namely the first surface 310 and the second surface 320, and disposed opposite to each other, namely the third surface 330 and the fourth surface 340. The pair of second electrode bus bars 700 may have different polarities from each other and may have a film shape with a predetermined size, similar to the pair of first electrode bus bars 500.

Meanwhile, the surfaces of the module case 300 where the second electrode bus bars 700 and the first electrode bus bars 500 are not provided, namely the fifth surface 350 and the sixth surface 360, may be nonpolar surfaces with no polarity. This is to prevent the surfaces having polarities from interfering each other when the plurality of battery modules 10 are coupled to each other, similar to the battery case 130 of the former embodiment.

The BMS unit 900 is provided inside the module case 300 and may manage the single battery cell 100 or the plurality of battery cells 100 as well as various electric components of the battery module 10.

The BMS unit 900 may include a communication module for wired or wireless communication. By doing so, the BMS unit 900 may exchange various cell data between the battery cells 100 in the module case 300 or between the plurality of battery modules 10.

Hereinafter, the coupling form of the battery modules 10 when a plurality of battery modules 10 are provided as a group will be described in detail.

Figure 12:
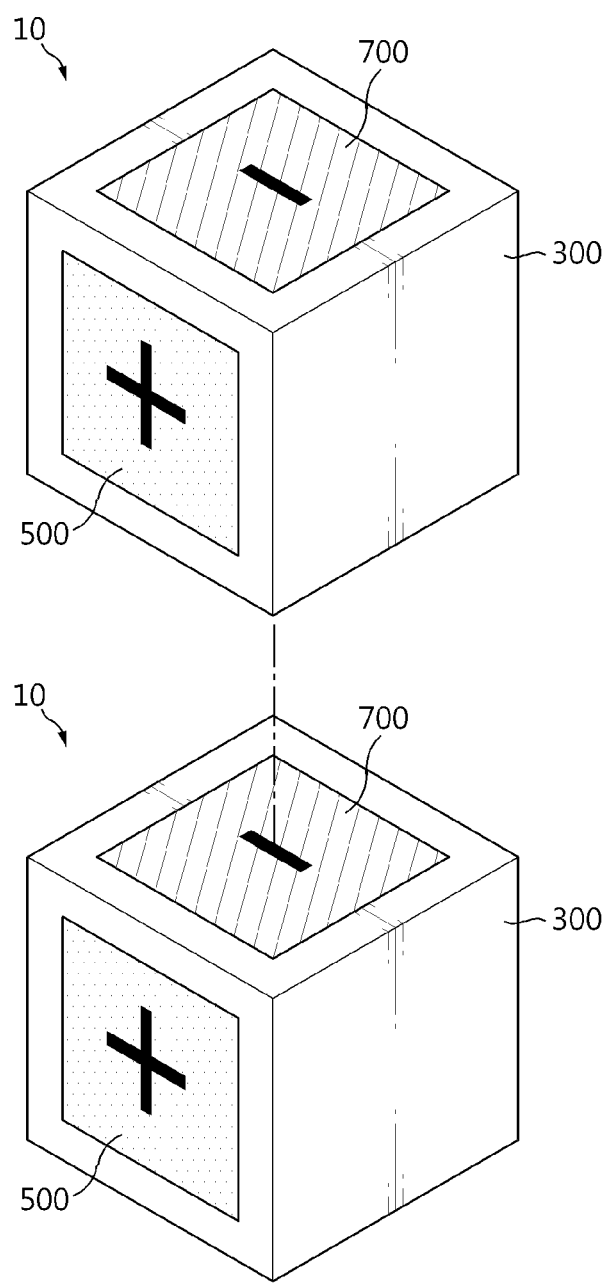
FIG. 12 is a diagram for illustrating a block coupling of the battery modules depicted in FIG. 10.

FIG. 12 is a diagram for illustrating a block coupling of the battery modules depicted in FIG. 10.

Referring to FIG. 12, when a plurality of the battery modules 10 are provided and coupled to each other, the battery modules 10 may be coupled in a simple way by means of simple block coupling. At this time, electric connection between them may be simply made during the block coupling by means of the two pairs of electrode bus bars 500, 700 with a film shape. The block coupling may be applied to both serial connection and parallel connection, similar to the battery cells 100 of the former embodiment.

As described above, the battery module 10 of this embodiment may enhance the degree of freedom of coupling when the plurality of battery modules 10 are coupled, by means of the module case 300 with a hexahedral shape and the two pairs of electrode bus bars 500, 700 provided at the outer surfaces of the module case 300, and may also secure easy workability by means of block coupling.

In addition, the battery module 10 of this embodiment may minimize a space loss such as an empty space, which may occur due to coupling, by means of the module case 300 with a hexahedral shape and the two pairs of electrode bus bars 500, 700 with a film shape, when the plurality of battery modules 10 are coupled.

Accordingly, when the plurality of battery modules 10 are coupled, the battery modules 10 of this embodiment may improve the energy density and also realize a slimmer structure according to the recent trend for a slimmer design.

Figure 13:
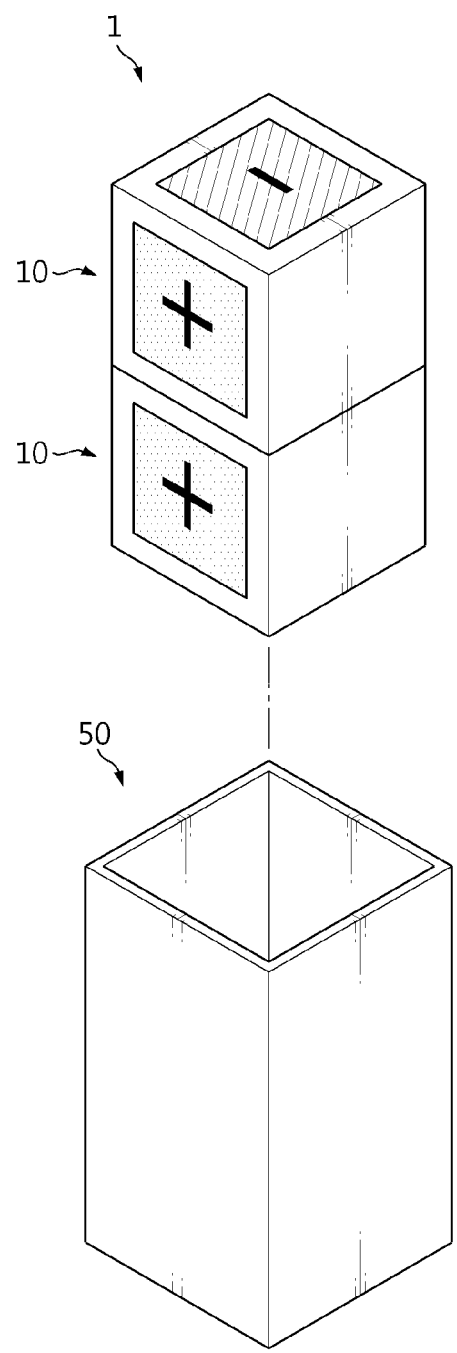
FIG. 13 is a diagram for illustrating a battery pack according to an embodiment of the present disclosure.

FIG. 13 is a diagram for illustrating a battery pack according to an embodiment of the present disclosure.

Referring to FIG. 13, a battery pack 1 may include a plurality of block-coupled battery modules 10 according to the former embodiment and a pack case 50 for packaging the block-coupled battery modules 10.

The battery pack 1 may be provided to a vehicle as a fuel source of the vehicle. As an example, the battery pack 1 may be provided to an electric vehicle, a hybrid vehicle, and various other-type vehicles capable of using the battery pack 1 as a fuel source. In addition, the battery pack 1 may be provided in other devices, instruments or facilities such as an energy storage system using a secondary battery, in addition to the vehicle.

As described above, the battery pack 1 of this embodiment and devices, instruments or facilities such as a vehicle, which have the battery pack 1, include the battery module 10 as described above, and thus it is possible to implement a battery pack 1 having all the advantages of the battery module 10 described above, or devices, instruments, facilities or the like such as a vehicle, which have the battery pack 1.

According to various embodiments of the present disclosure as above, it is possible to provide a battery cell 100, a battery module 10, and a battery pack 1 and a vehicle including the same, which may increase the degree of freedom of coupling when the plurality of battery cells 100 or the plurality of battery modules 10 are provided and coupled to each other.

Moreover, according to various embodiments, it is possible to provide a battery cell 100, a battery module 10, and a battery pack 1 and a vehicle including the same, which may improve the energy density.

In addition, according to various embodiments, it is possible to provide a battery cell 100, a battery module 10, and a battery pack 1 and a vehicle including the same, which may have a slimmer structure according to the recent trend for a slimmer design.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery cell, comprising:
an electrode assembly;
a battery case configured to accommodate the electrode assembly; and
two pairs of electrode leads provided at outer surfaces of the battery case and connected to the electrode assembly,
wherein the battery case has a hexahedral shape having six outer surfaces, and
wherein each side of the hexahedral shape cannot have more than one electrode lead.

2. The battery cell according to claim 1,
wherein the two pairs of electrode leads are provided to four outer surfaces among the six outer surfaces of the battery case.

3. The battery cell according to claim 2,
wherein the two pairs of electrode leads include:
a pair of first electrode leads provided at a first outer surface of the four outer surfaces of the battery case and a second outer surface of the four outer surfaces of the battery case and disposed opposite to the first outer surface; and
a pair of second electrode leads provided at a third outer surface of the four outer surfaces of the battery case and a fourth outer surface of the four outer surfaces of the battery case, which are adjacent to the first outer surface and the second outer surface and disposed opposite to each other.

4. The battery cell according to claim 3,
wherein the pair of first electrode leads have different polarities.

5. The battery cell according to claim 3,
wherein the pair of second electrode leads have different polarities.

6. The battery cell according to claim 1,
wherein the battery cell is provided in plural, and the plurality of battery cells are block-coupled to each other.

7. A battery module, comprising:
at least one battery cell;
a module case configured to accommodate the at least one battery cell; and
two pairs of electrode bus bars provided at outer surfaces of the module case and electrically connected to the at least one battery cell,
wherein the module case has a hexahedral shape having six outer surfaces, and
wherein each side of the hexahedral shape cannot have more than one electrode bus bar.

8. The battery module according to claim 7,
wherein the two pairs of electrode bus bars are provided at four outer surfaces among the six outer surfaces of the module case.

9. The battery module according to claim 8,
wherein the two pairs of electrode bus bars include:
a pair of first electrode bus bars provided at a first outer surface of the four outer surfaces of the module case and a second outer surface of the four outer surfaces of the module case and disposed opposite to the first outer surface; and
a pair of second electrode bus bars disposed at a third outer surface of the four outer surfaces of the module case and a fourth outer surface of the four outer surfaces of the module case, which are adjacent to the first outer surface and the second outer surface and disposed opposite to each other.

10. The battery module according to claim 9,
wherein the pair of first electrode bus bars have different polarities.

11. The battery module according to claim 9,
wherein the pair of second electrode bus bars have different polarities.

12. The battery module according to claim 7, further comprising:
a battery management system provided in the module case to manage the at least one battery cell.

13. A battery pack, comprising:
at least one battery module as defined in claim 7; and
a pack case configured to package the at least one battery module.

14. The battery pack according to claim 13,
wherein the battery module is provided in plural, and the plurality of battery modules are block-coupled to each other.

15. A vehicle, comprising at least one battery pack as defined in claim 13.

* * * * *